US007296858B2

(12) United States Patent
Ruspa

(10) Patent No.: US 7,296,858 B2

(45) Date of Patent: Nov. 20, 2007

(54) VEHICLE SEAT ARMREST ASSEMBLY

(75) Inventor: Luigi Ruspa, Turin (IT)

(73) Assignee: Ruspa Officine S.p.A., Robassomero (IT)

(*) Notice: Subject to any disclaimer, the term of this patent is extended or adjusted under 35 U.S.C. 154(b) by 0 days.

(21) Appl. No.: 11/281,863

(22) Filed: Nov. 17, 2005

(65) Prior Publication Data

US 2006/0119160 A1 Jun. 8, 2006

(30) Foreign Application Priority Data

Nov. 19, 2004 (IT) .......................... TO2004A0815

(51) Int. Cl.
*B60N 2/46* (2006.01)
*A47C 7/00* (2006.01)

(52) U.S. Cl. ............................ 297/411.32; 297/411.27; 297/440.1

(58) Field of Classification Search ........... 297/411.32, 297/411.3, 411.38, 411.2, 411.33, 115, 411.29, 297/411.45, 411.35, 411.26, 411.27, 411.28, 297/440.22, 411.24, 411.23, 440.14, 440.1; 248/118

See application file for complete search history.

(56) References Cited

U.S. PATENT DOCUMENTS

| | | | | |
|---|---|---|---|---|
| RE19,721 | E * | 10/1935 | Genung | 297/411.21 |
| 2,249,849 | A * | 7/1941 | Owler | 297/115 |
| 3,397,912 | A * | 8/1968 | Bush | 297/354.12 |
| 3,886,611 | A * | 6/1975 | Lammy et al. | 114/363 |
| 4,466,664 | A * | 8/1984 | Kondou | 297/411.39 |
| 4,807,935 | A * | 2/1989 | King | 297/411.38 |
| 5,171,063 | A * | 12/1992 | Stidd | 297/344.1 |
| 5,597,209 | A * | 1/1997 | Bart et al. | 297/411.38 |
| 6,168,236 | B1 * | 1/2001 | Chen | 297/411.2 |
| 6,203,101 | B1 * | 3/2001 | Chou et al. | 297/115 |
| 7,063,387 | B2 * | 6/2006 | Herault | 297/411.32 |
| 2004/0005425 | A1 * | 1/2004 | Gaylord et al. | 428/36.9 |

* cited by examiner

*Primary Examiner*—Milton Nelson, Jr.
(74) *Attorney, Agent, or Firm*—Ohlandt, Greeley, Ruggiero & Perle L.L.P.

(57) ABSTRACT

An armrest assembly having a fastening plate connected to a vehicle seat; a hinge device connected to the fastening plate; and an armrest connected removably to the hinge device and movable between a work position, in which the armrest is tilted and projects with respect to the fastening plate, and a collapsed position, in which the armrest is adjacent to the fastening plate.

6 Claims, 4 Drawing Sheets

21
29
22
5
27
6
20

15
15
4
31
26
8
12
2
2a
32
10
31
11
32
17
2a
31
31
31
31
32
2a
2a
16
7
32

VEHICLE SEAT ARMREST ASSEMBLY

CROSS-REFERENCE TO RELATED APPLICATIONS

This application claims the benefit of Italian Patent Application Number T02004A 000815, filed on Nov. 19, 2004, the contents of which are incorporated by reference herein.

BACKGROUND OF THE INVENTION

1. Field of the Invention

The present invention relates to an armrest assembly for a vehicle, e.g. bus, seat.

An armrest assembly comprises a fastening plate connected laterally to a bus seat; and a rotary armrest hinged to the fastening plate and movable between a work position, in which the armrest supports the passenger's arm, and a collapsed position, in which the armrest is rotated towards a seat portion of the seat to allow the passenger to exit easily.

2. Description of the Related Art

Armrest assemblies are normally formed in one piece and specially designed for a given bus interior, so that each new interior design calls for redesigning and high-cost retooling of new production lines. For the same reason, replacement of any damaged parts is relatively expensive.

SUMMARY OF THE INVENTION

It is an object of the present invention to provide an armrest assembly designed to eliminate the aforementioned drawbacks, and which is cheap and easy to produce.

According to the present invention, there is provided an armrest assembly as claimed in attached claims.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
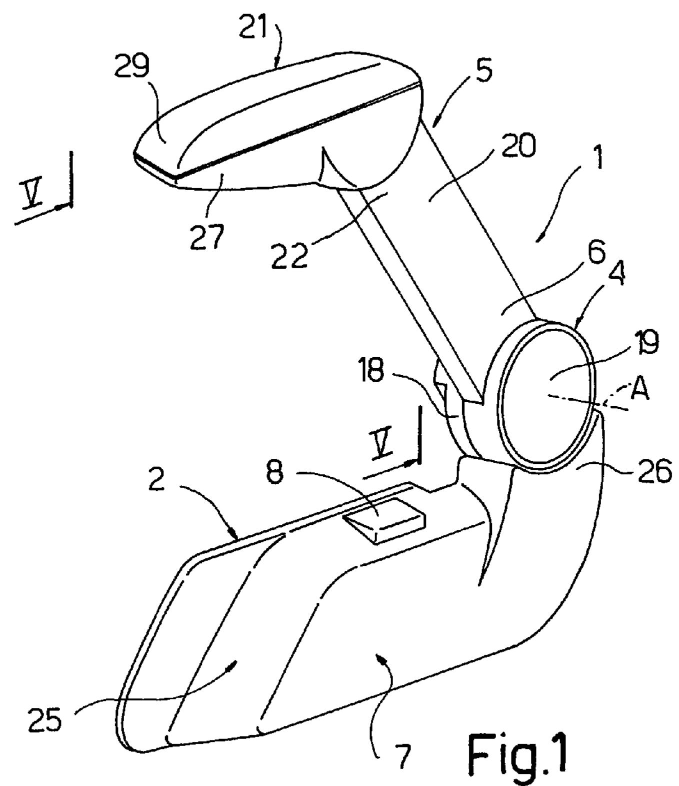
FIG. 1 shows a view in perspective of an armrest assembly in accordance with the present invention.

Number 1 in FIG. 1 indicates as a whole an armrest assembly comprising a flat fastening plate 2 which is fitted removably to a lateral portion of a bus seat 3; a hinge device 4 connected removably to plate 2; and an armrest 5 having an end portion 6 connected to hinge device 4 and rotating about an axis A perpendicular to plate 2.

The armrest assembly also comprises a lateral cover plate 7 fitted removably to plate 2 and housing a control block 8 for adjusting the tilt of a backrest 9 of seat 3.

Figure 4:
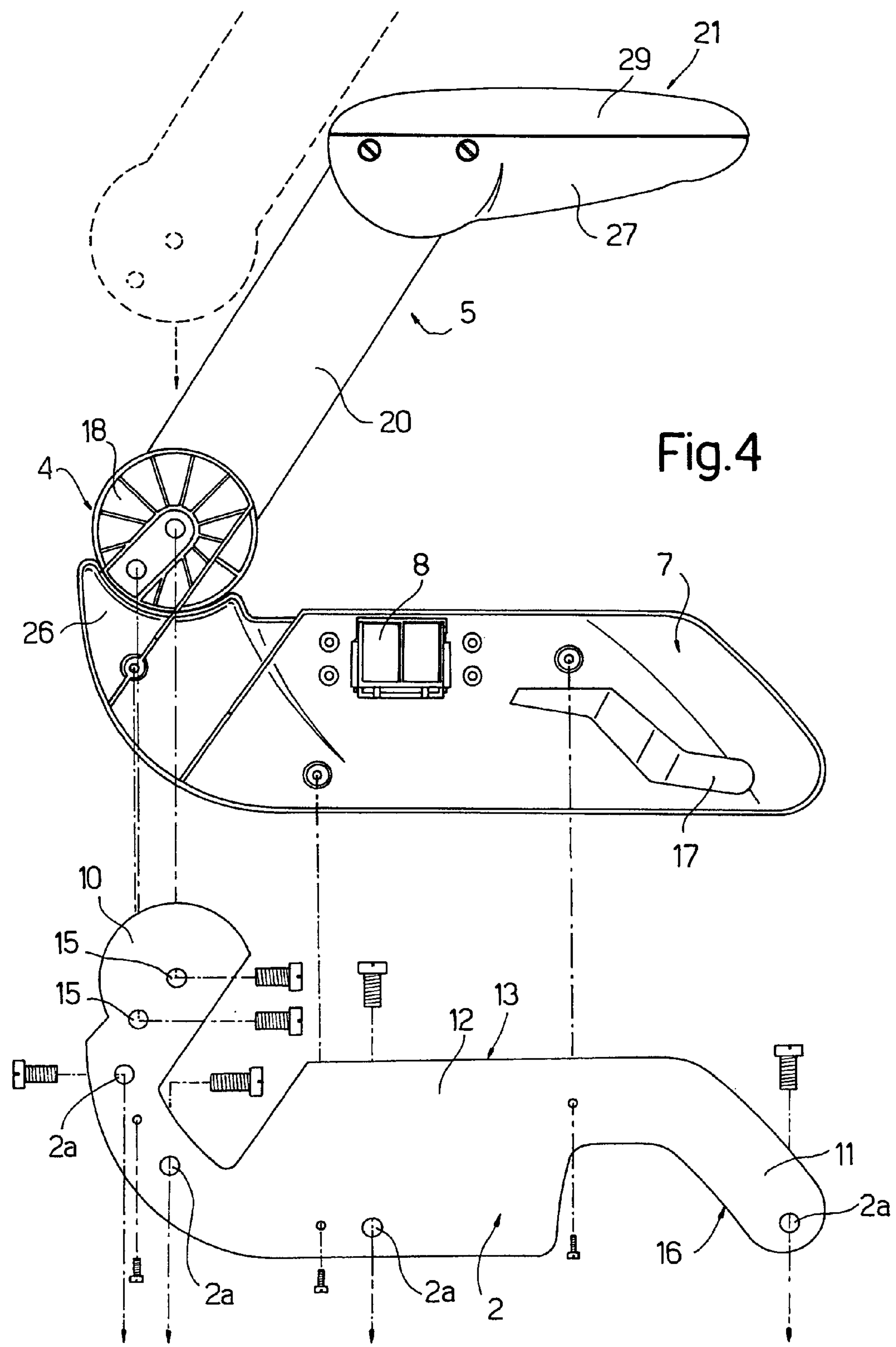
FIG. 4 shows an exploded left-side view of FIG. 1.

More specifically (FIG. 4), plate 2 is elongated in shape, and comprises a number of holes 2*a* for connection to seat 3, and a first and second curved end portion 10, 11 substantially forming an S with a rectangular central reinforcing plate 12 having a straight longitudinal edge 13 substantially parallel, in use, to a seat portion 14 of seat 3.

Figure 6:
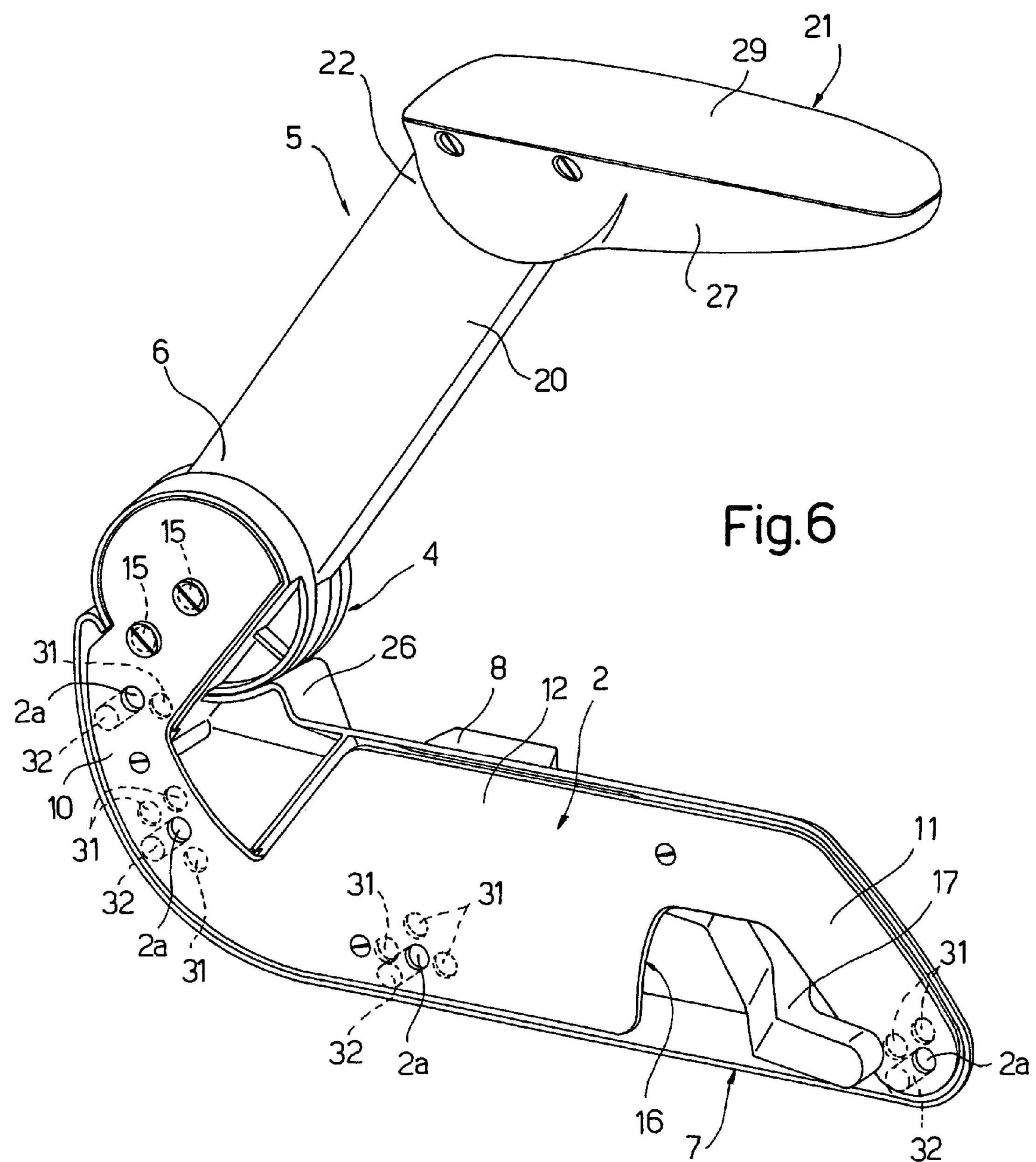
FIG. 6 shows a view in perspective of a second embodiment of an armrest assembly in accordance with the present invention.

First curved portion 10 projects with respect to longitudinal edge 13, and has two holes 15 for connection to hinge device 4; and second curved portion 11 defines, with central reinforcing plate 12, a recess 16 open on the opposite side to longitudinal edge 13 and housing a bracket portion 17 projecting from cover plate 7 in a direction substantially parallel to longitudinal edge 13 and resting on second curved portion 11, on the opposite side of plate 2 to cover plate 7 (FIG. 6).

In actual use, bracket portion 17 projects with respect to plate 2, presses laterally against seat portion 14, and is supported by second curved portion 11 to retain an upholstery fabric of seat 3.

Hinge device 4 connected to first curved portion 10 comprises a fixed, cup-shaped casing 18 connected to plate 2; and a supporting disk 19 rotating about axis A and connected to armrest 5, which comprises a straight hollow arm 20 made of extruded aluminium, having a rectangular internal cross section and supporting end portion 6, and comprises a supporting member 21 connected transversely to an end portion 22 of arm 20 opposite to end portion 6.

Figure 5:
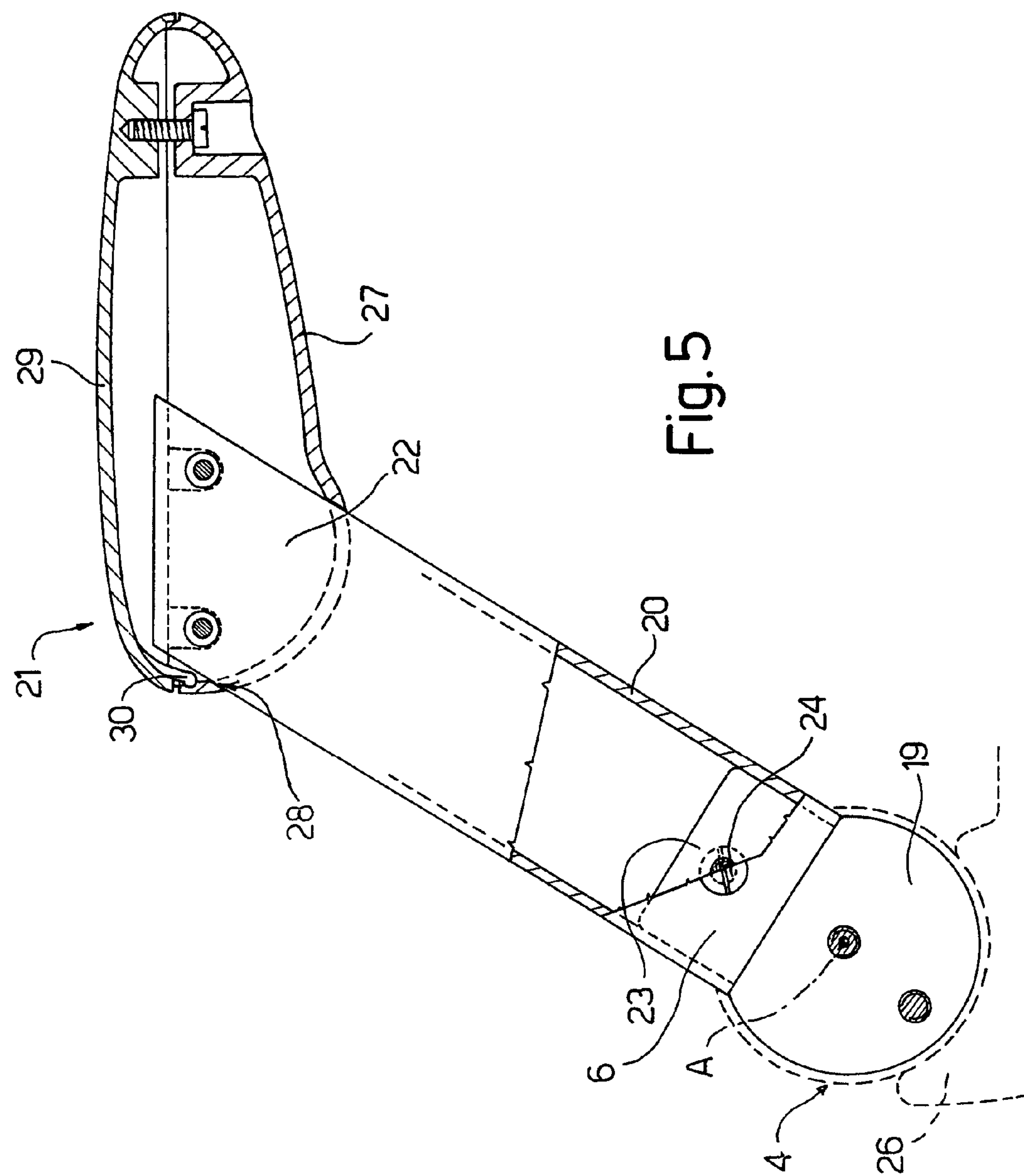
FIG. 5 shows a partial section along line V-V in FIG. 1.

Disk 19 comprises a radial projection 23 having a rectangular cross section shaped to fit inside end portion 6 (FIG. 5) and fixed radially by a transverse screw 24 parallel to axis A.

Figure 2:
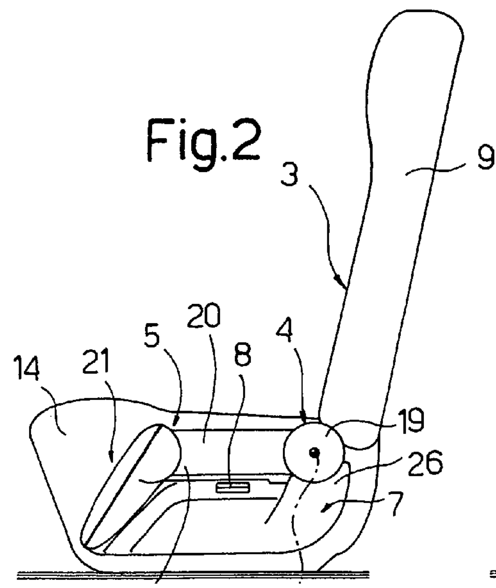
FIGS. 2 and 3 show right-side views of FIG. 1 in a first and second position respectively.
Figure 3:
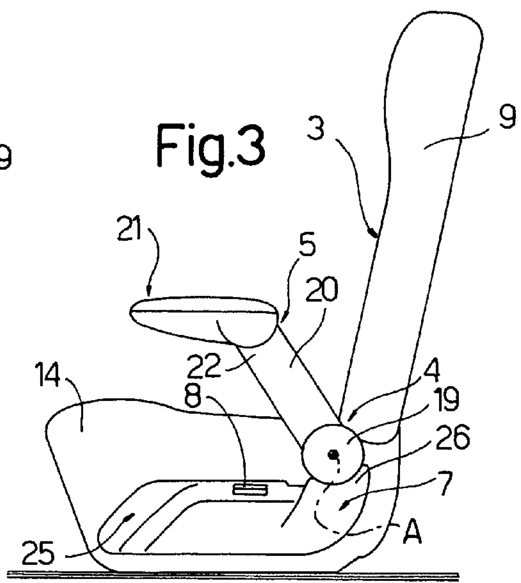

Disk 19 is connected to cup-shaped casing 18 by a known cam mechanism movable between a work position (FIG. 3), in which arm 20 slopes with respect to longitudinal edge 13 of plate 2 and supporting member 21 is substantially parallel to longitudinal edge 13, and a collapsed position (FIG. 2), in which arm 20 is parallel to longitudinal edge 13 and supporting member 21 is housed in a concave portion 25 of cover plate 7, which also comprises a contoured arc-shaped portion 26 located at the opposite end to concave portion 25 and radially housing a portion of cup-shaped casing 18.

At the opposite end of arm 20, supporting member 21 comprises a bottom shell 27 having an opening 28 housing end portion 22; and a top supporting shell 29 connected to opposite ends of bottom shell 27 by a joint 30 at one end and by a screw at the opposite end.

The advantages of the armrest assembly according to the present invention will be clear from the foregoing description.

In particular, being connected removably, preferably using screws, hinge device 4, arm 20, supporting member 21, and plate 2 can be replaced independently to reconfigure and achieve greater versatility of the assembly. For example, the length of armrest 5 may be changed by simply changing arm 20, or, in the event of damage, supporting member 21 may be changed, while preserving the other component parts of armrest assembly 1.

Using a metal extrusion and a form fit with disk 19 provides for achieving a high degree of strength cheaply and easily.

Moreover, using a metal extrusion, different looks can be achieved easily to better adapt to different vehicle interiors.

The joint connecting top and bottom shells 29, 27 of supporting member 21 provides for easy, low-cost assembly and maintenance.

Clearly, changes may be made to the assembly as described and illustrated herein without, however, departing from the scope of the present invention, as defined in the accompanying Claims.

In particular (FIG. 6), plate 2 may have a number of additional, equally spaced fastening holes 31 to adapt plate 2 easily to any arrangement of screws 32 for connection to seat 3, in addition to fastening holes 2*a*.

The invention claimed is:

1. An armrest assembly comprising:

a fastening plate connected to a vehicle seat;

a hinge device connected to said fastening plate, said hinge device having a portion movable between a work position and a collapsed position; and an armrest connected to said hinge device and movable between said work position and said collapsed position, said armrest being tilted and projecting with respect to said fastening plate in said work position, said armrest being adjacent to said fastening plate in said collapsed position, said armrest having an arm connected removably to said portion, said armrest having a supporting member connected removably to said arm, wherein said supporting member comprises two complementary shells having form-fit connecting devices.

2. The armrest assembly as claimed in claim 1, wherein at least one of said hinge device and said arm comprises a complementary projection on shaped to fit to a portion of the other of said hinge device and said arm.

3. The armrest assembly as claimed in claim 1, wherein said hinge device is connected removably to said fastening plate.

4. The armrest assembly as claimed in claim 1, wherein said arm comprises an extruded metal member.

5. The armrest assembly as claimed in claim 1, wherein said portion is a supporting disk that comprises a radial projection.

6. An armrest assembly comprising:

a fastening plate connected to a vehicle seat;

a hinge device connected to said fastening plate, said hinge device having a portion movable between a work position and a collapsed position; and an armrest connected to said hinge device and movable between said work position and said collapsed position, said armrest being tilted and projeting with respect to said fastening plate in said work position, said armrest being adjacent to said fastening plate in said collapsed position, said armrest having an arm connected removably to said portion, wherein said fastening plate has a first number of fastening holes and a second number of additional fastening holes which cooperate with a plurality of screws to adapt to different arrangements of said plurality or screws on said vehicle seat.

* * * * *